United States Patent
Fenton et al.

(10) Patent No.: US 6,840,323 B2
(45) Date of Patent: Jan. 11, 2005

(54) TUBING ANNULUS VALVE

(75) Inventors: Stephen P. Fenton, Houston, TX (US); Jon E Hed, Houston, TX (US); Robert N. Rogers, Katy, TX (US)

(73) Assignee: ABB Vetco Gray Inc., Houston, TX (US)

( * ) Notice: Subject to any disclaimer, the term of this patent is extended or adjusted under 35 U.S.C. 154(b) by 23 days.

(21) Appl. No.: 10/336,122

(22) Filed: Jan. 3, 2003

(65) Prior Publication Data

US 2003/0226666 A1 Dec. 11, 2003

Related U.S. Application Data

(60) Provisional application No. 60/386,624, filed on Jun. 5, 2002, and provisional application No. 60/425,377, filed on Nov. 12, 2002.

(51) Int. Cl.[7] .............................................. E21B 43/01
(52) U.S. Cl. ........................................ 166/368; 166/348
(58) Field of Search ................................ 166/336, 337, 166/348, 368, 86.2, 87.1

(56) References Cited

U.S. PATENT DOCUMENTS

| | | |
|---|---|---|
| 3,360,048 A | 12/1967 | Watkins |
| 4,333,526 A | 6/1982 | Watkins |
| 4,541,753 A | 9/1985 | Langner |
| 5,044,432 A | 9/1991 | Cunningham et al. |
| 5,143,158 A * | 9/1992 | Watkins et al. ............. 166/344 |
| 5,687,794 A | 11/1997 | Watkins et al. |
| 5,769,162 A | 6/1998 | Bartlett et al. |
| 6,378,613 B1 | 4/2002 | Kent et al. |
| 6,681,850 B2 * | 1/2004 | Bartlett et al. ............. 166/86.2 |
| 2002/0029887 A1 | 3/2002 | Baskett et al. |
| 2003/0094284 A1 * | 5/2003 | Fenton et al. ............... 166/366 |
| 2003/0146000 A1 * | 8/2003 | Dezen et al. ............... 166/368 |

FOREIGN PATENT DOCUMENTS

| | | |
|---|---|---|
| EP | 0 349 685 | 1/1990 |
| GB | 2108551 A | 5/1983 |
| GB | 2311544 A | 1/1997 |

* cited by examiner

Primary Examiner—William Neuder
(74) Attorney, Agent, or Firm—Bracewell & Patterson, LLP

(57) ABSTRACT

A subsea wellhead assembly has a tubing hanger with a tubing annulus passage and a production passage. A metal-sealing shuttle valve is mounted in the tubing hanger for blocking upward flow through the tubing annulus passage. The shuttle valve has a retention mechanism that prevents the shuttle from moving to the open position when fluid pressure is applied from above. The retention mechanism is released by the running tool after testing has been completed, causing the shuttle to close. The tree has an engaging member that can be stroked downward into the tubing hanger annulus passage to move the shuttle valve to the open position for communicating with the annulus.

22 Claims, 5 Drawing Sheets

Fig. 5
Fig. 6
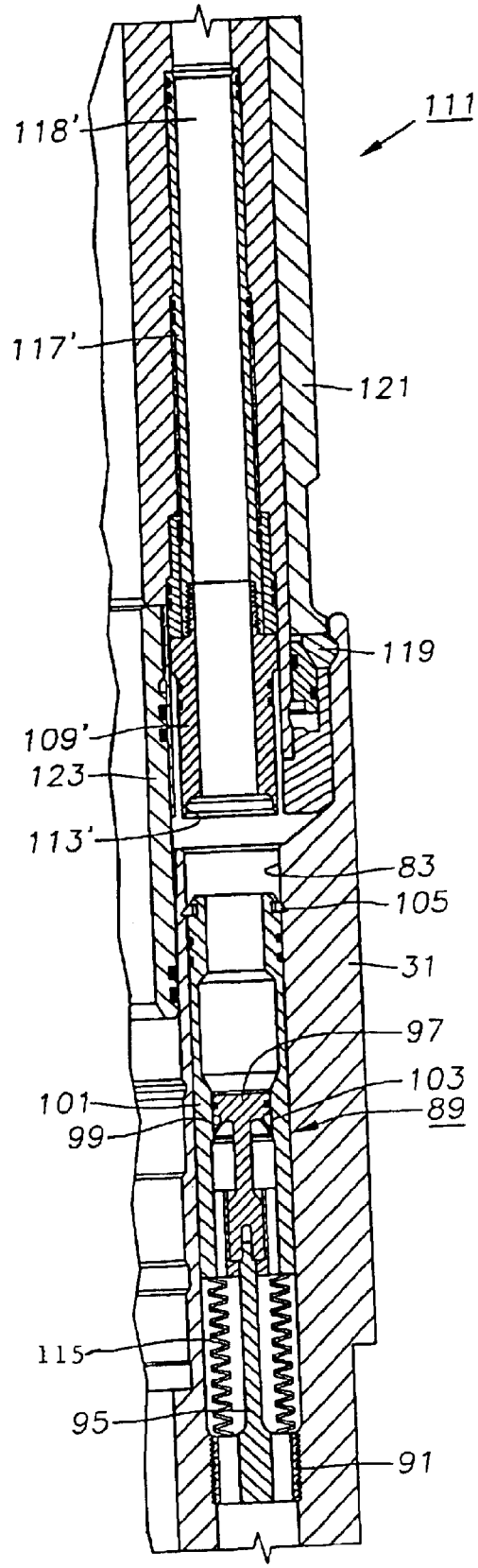
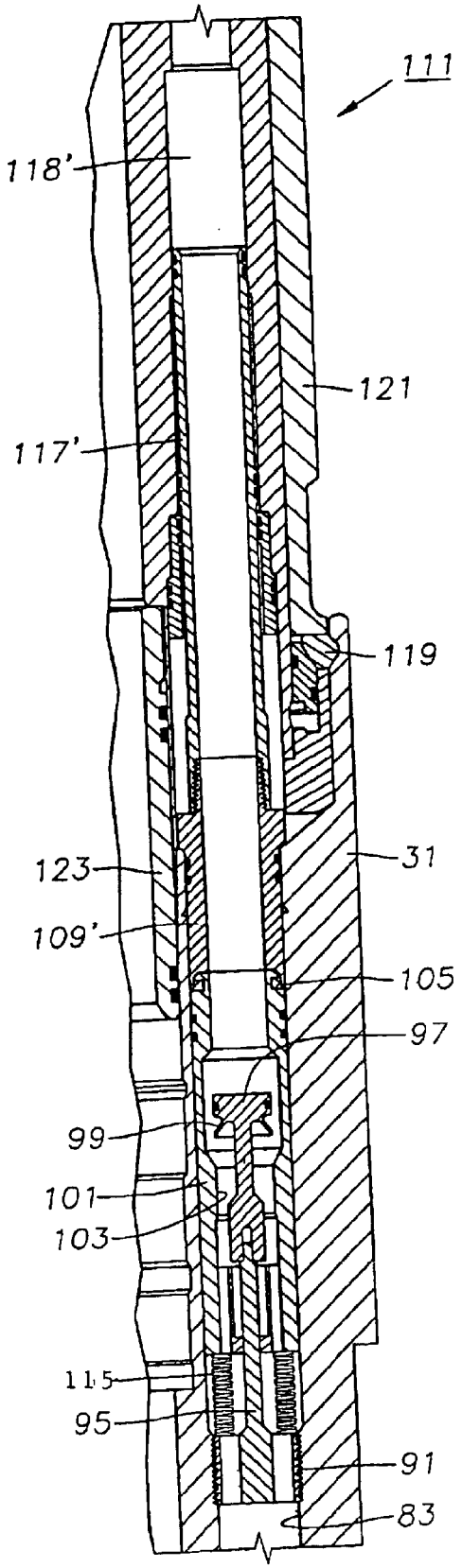

TUBING ANNULUS VALVE

This application claims priority from the provisional application Ser. No. 60/386,624, filed Jun. 5, 2002, entitled "Tubing Annulus Valve" and provisional application Ser. No. 60/425,377, filed Nov. 12, 2002, entitled "Drilling and Producing Deep Water Subsea Wells".

FIELD OF THE INVENTION

This invention relates in general to subsea wellhead systems and in particular to a tubing hanger with a tubing annulus passage and a tubing annulus valve with features to facilitate testing.

BACKGROUND OF THE INVENTION

A typical subsea wellhead assembly has a high pressure wellhead housing supported in a lower pressure wellhead housing and secured to casing that extends into the well. One or more casing hangers land in the wellhead housing, the casing hanger being located at the upper end of a string of casing that extends into the well to a deeper depth. A string of tubing extends through the casing for production fluids. A Christmas or production tree mounts to the upper end of the wellhead housing for controlling the well fluid. The production tree is typically a large, heavy assembly, having a number of valves and controls mounted thereon.

One type of tree, sometimes called "conventional", has two bores through it, one of which is the production bore and the other is the tubing annulus access bore. In this type of wellhead assembly, the tubing hanger lands in the wellhead housing. The tubing hanger has two passages through it, one being the production passage and the other being an annulus passage that communicates with the tubing annulus surrounding the tubing. Access to the tubing annulus is necessary to circulate fluids down the production tubing and up through the tubing annulus, or vice versa, to either kill the well or circulate out heavy fluid during completion. After the tubing hanger is installed and before the drilling riser is removed for installation of the tree, plugs are temporarily placed in the passages of the tubing hanger. The tree has isolation tubes that stab into engagement with the passages in the tubing hanger when the tree lands on the wellhead housing. This type of tree is normally run on a completion riser that has two strings of conduit. In a dual string completion riser, one string extends from the production passage of the tree to the surface vessel, while the other extends from the tubing annulus passage in the tree to the surface vessel. It is time consuming, however to assemble and run a dual string completion riser. Also, drilling vessels may not have such a completion riser available, requiring one to be supplied on a rental basis.

In another type of tree, sometimes called "horizontal" tree, there is only a single bore in the tree, this being the production passage. The tree is landed before the tubing hanger is installed, then the tubing hanger is lowered and landed in the tree. The tubing hanger is lowered through the riser, which is typically a drilling riser. Access to the tubing annulus is available through choke and kill lines of the drilling riser. The tubing hanger does not have an annulus passage through it, but a bypass extends through the tree to a void space located above the tubing hanger. This void space communicates with the choke and kill lines when the blowout preventer is closed on the tubing hanger running string. In this system, the tree is run on drill pipe, thus prevents the drilling rig derrick of the floating platform from being employed on another well while the tree is being run.

In another and less common type of wellhead system, a concentric tubing hanger lands in the wellhead housing in the same manner as a conventional wellhead assembly. The tubing hanger has a production passage and an annulus passage. However, the production passage is concentric with the axis of the tubing hanger, rather than slightly offset as in conventional tubing hangers. The tree does not have a vertical tubing annulus passage through it, thus a completion riser is not required. Consequently the tree may be run on a monobore riser. A tubing annulus valve is located in the tubing hanger since a plug cannot be temporarily installed and retrieved from the tubing annulus passage with this type of tree.

Normally, the tubing annulus valve is a check valve that prevents upward flow that might occur through the tubing annulus but allows downward flow. A disadvantage is that one cannot readily test a tubing annulus check valve to determine whether or not it is properly closely. Proposals have been made to use a tubing annulus valve that is hydraulically actuated and thus could be tested from above. However, the proposals require hydraulic passages in the tubing hanger, which take up space and add complexity to the tubing hanger.

SUMMARY OF THE INVENTION

The subsea wellhead assembly of this invention utilizes an essentially concentric tubing hanger and a lightweight tree, and thus, does not require running of a dual string completion riser. The tree may be efficiently run on a lift line or cable, although it may also be run on a small diameter, lightweight riser. The tree is a monobore, having no annulus passage that extends vertically through it. Rather, annulus access is provided by a passage that leads to an exterior side portion of the tree for connection to an external line.

The tubing hanger lands in the wellhead housing in the preferred embodiment. The tubing hanger has a production passage that registers with the production passage of the tree when the tree lands. An isolation tube extends from the tree into the tubing hanger for communicating the production tubing with the production passage in the tree.

The tubing hanger also preferably has an offset tubing annulus passage. The tubing annulus passage communicates the tubing annulus with a void space surrounding the isolation tube above the tubing hanger. A tubing annulus valve is located in the upper end of the tubing annulus passage for selectively blocking communication between the void space and the tubing annulus passage. The tubing annulus valve of the preferred embodiment has a primary dynamic metal-to-metal seal for enhanced durability.

The tubing annulus valve includes a movable member that moves between an open position and a closed position. Preferably, the movement is vertical, with the open position being below the closed position. Preferably, all of the hydraulic circuitry for moving the valve between the open and closed positions is located exterior of the tubing hanger. The valve moves to the open position in response to an engaging member of the tubing hanger running tool, and subsequently, an engaging member of the tree. A retention device retains the valve in the closed position. This allows test fluid pressure to be applied from above to the tubing annulus passage without causing the valve to shift to the open position. When the engaging member engages the movable member of the valve, it releases the retention device.

BRIEF DESCRIPTION OF DRAWINGS

FIG. 5 is an enlarged sectional view of the tubing annulus valve of FIG. 3, shown in a closed position while a tubing hanger running tool is connected to the tubing hanger.

FIG. 6 is a sectional view of the tubing annulus valve as shown in FIG. 5, but shown in a closed position.

DETAILED DESCRIPTION OF THE INVENTION

Figure 1A:
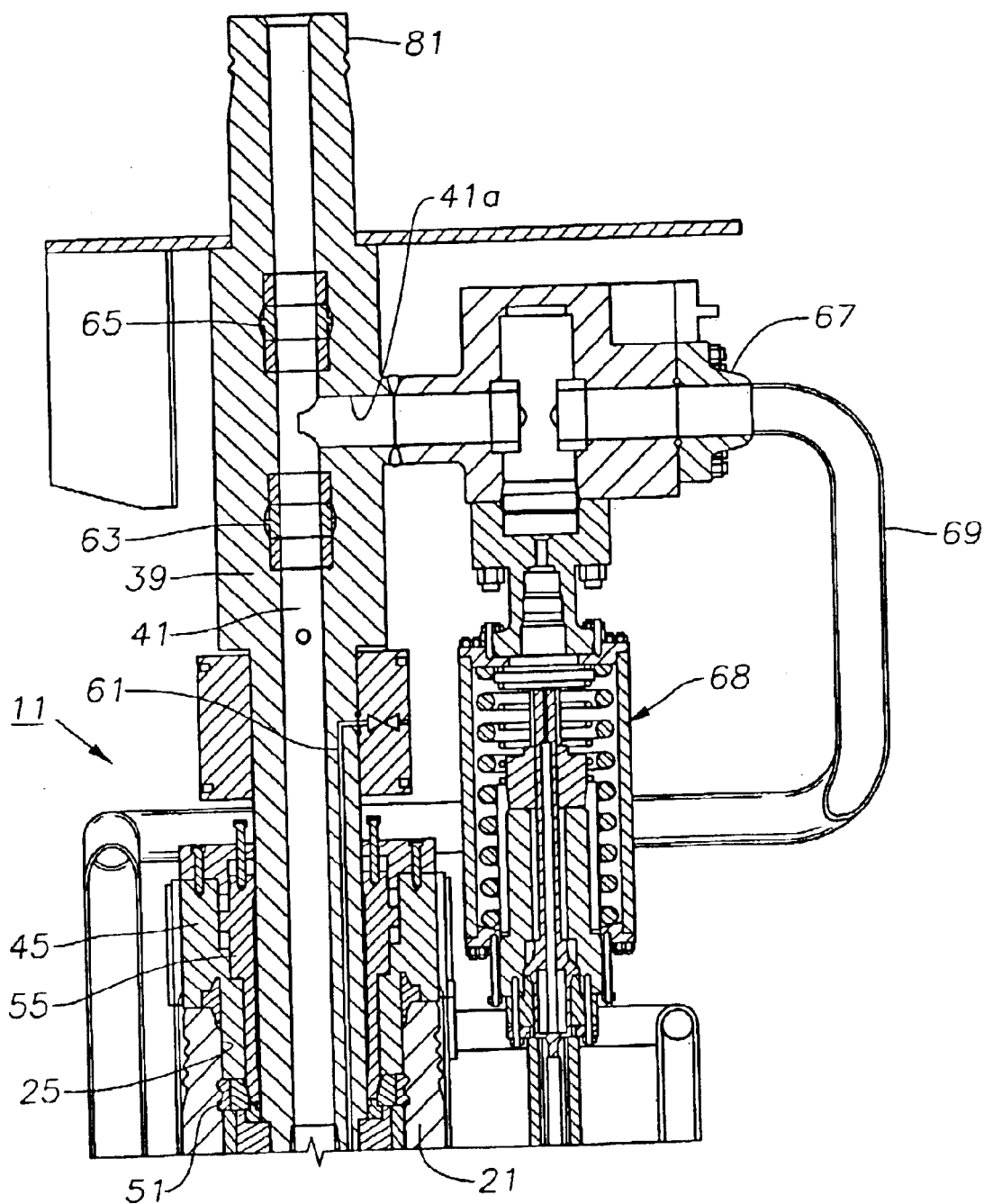
FIGS. 1A and 1B comprise a vertical sectional view of a wellhead assembly constructed in accordance with this invention.
Figure 1B:
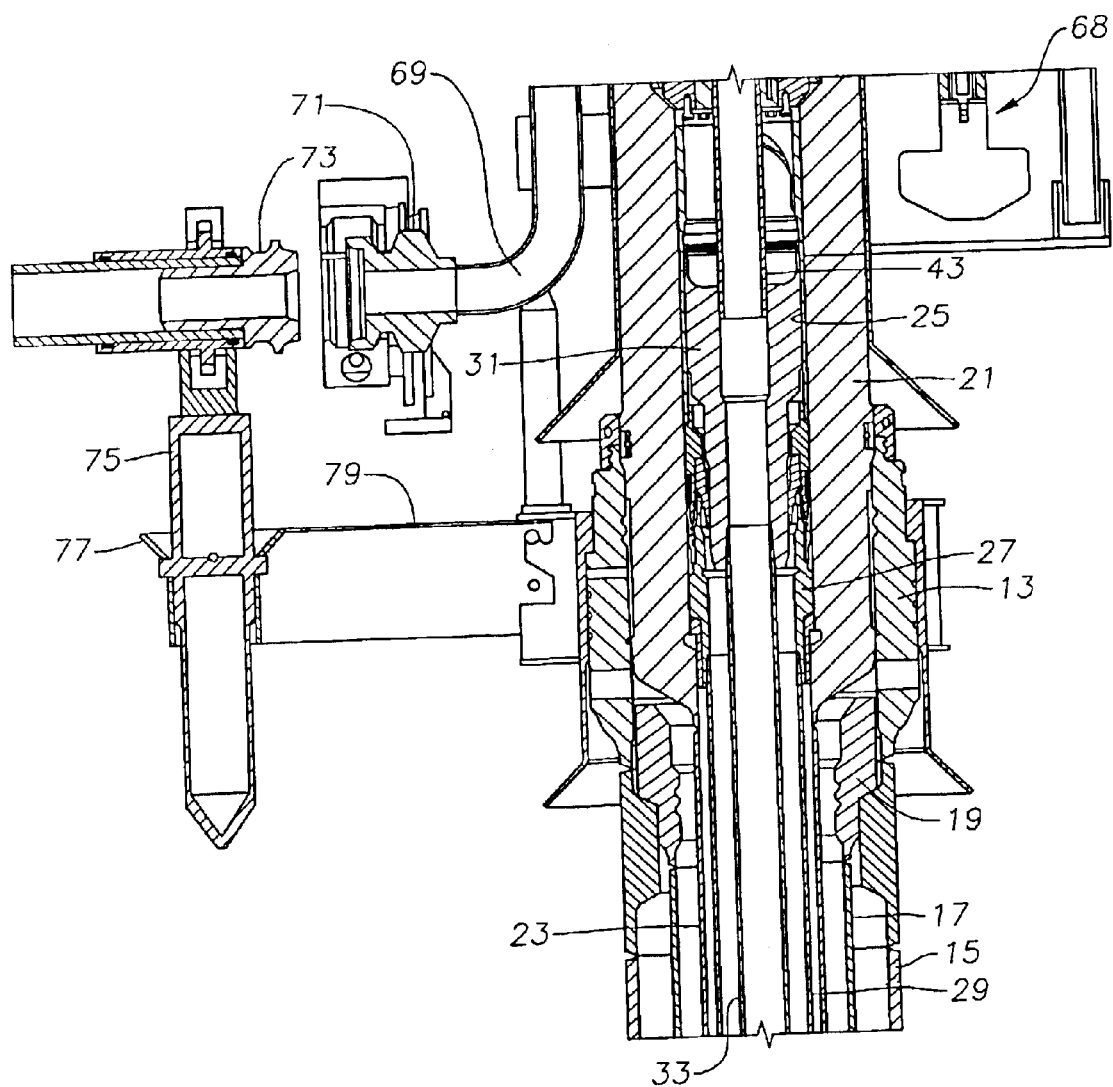

Referring to FIG. 1B, a lower portion of a wellhead assembly 11 includes an outer or low pressure wellhead housing 13 that locates on the sea floor and is secured to a string of large diameter conductor pipe 15 that extends into the well. In this embodiment, a first string of casing 17 is suspended on a lower end of outer wellhead housing 13 by a hanger 19. However, casing 17 and hanger 19 are not always suspended from the outer wellhead housing 13 and can be eliminated in many cases.

An inner or high pressure wellhead housing 21 lands in and is supported within the bore of outer wellhead housing 13. Inner wellhead housing 21 is located at the upper end of a string of casing 23 that extends through casing 17 to a greater depth. Inner wellhead housing 21 has a bore 25 with at least one casing hanger 27 located therein. Casing hanger 27 is sealed within bore 25 and secured to the upper end of a string of casing 29 that extends through casing 23 to a greater depth. In this embodiment, a tubing hanger 31 is landed within bore 25 of inner wellhead housing 21. Specifically, tubing hanger 31 lands within casing hanger 27. Tubing hanger 31 is sealed to casing hanger 27 and secured to the upper end of a string of production tubing 33. Tubing hanger 31 has a production passage 32 that is coaxial with tubing 33.

Figure 2:
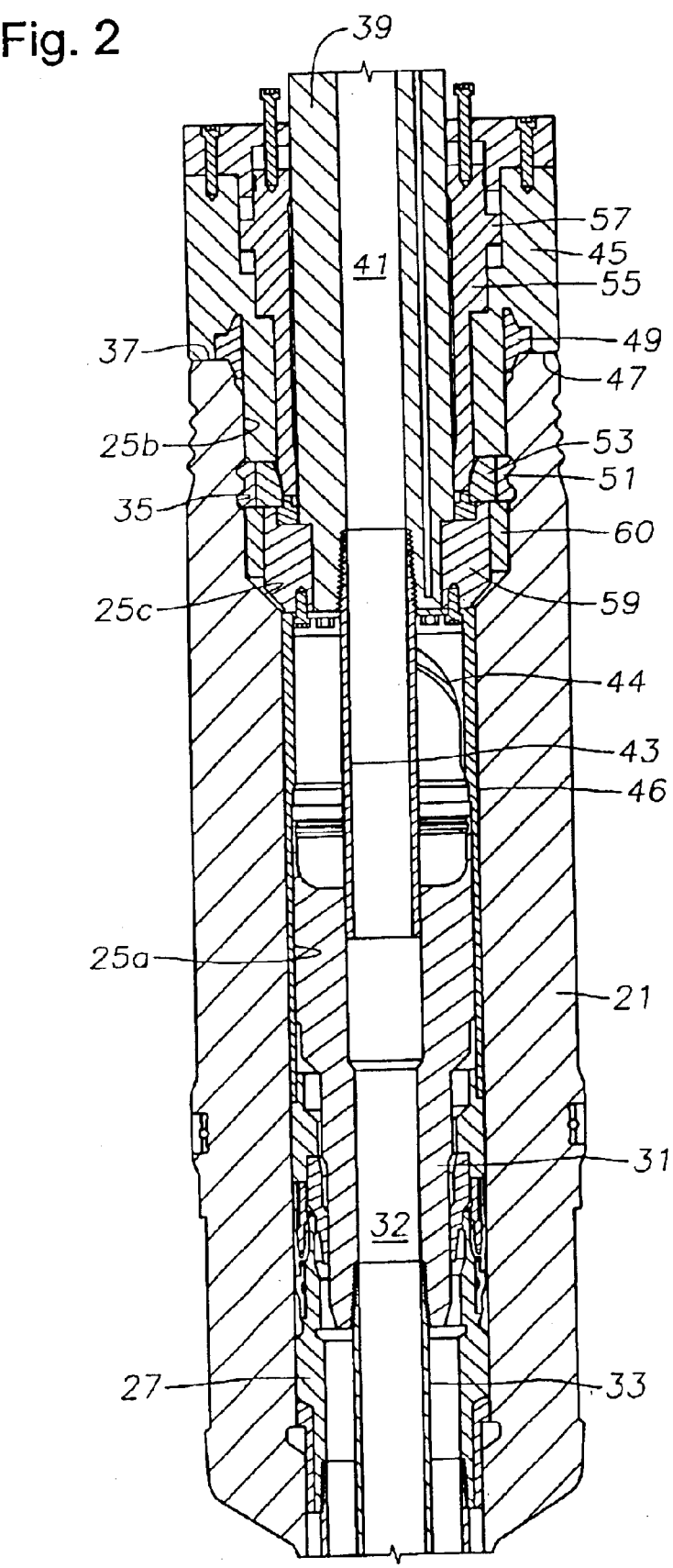
FIG. 2 is an enlarged sectional view of a portion of the wellhead assembly of FIG. 1.

Referring to FIG. 2, bore 25 has a lower portion 25a that has a smaller diameter than upper portion 25b. This results in a conical generally upward facing transition portion or shoulder 25c located between portions 25a and 25b. Wellhead housing bore upper portion 25b has a grooved profile 35 formed therein above tubing hanger 31. Profile 35 is located a short distance below rim 37, which is the upper end of inner wellhead housing 21.

As shown in FIG. 1A, a Christmas or production tree 39 has a lower portion that inserts into wellhead housing 21. Production tree 39 has a production passage 41 extending through it that has an outlet port 41a extending laterally outward. Production tree 39 has an isolation tube 43 that depends downward from its lower end and stabs sealingly into production passage 32 of tubing hanger 31. The lower end of production tree 39 extends into bore 25 of inner wellhead housing 21 to bore transition section 25c (FIG. 2).

Referring again to FIG. 2, an orientation member 44 is a part of and extends upward from tubing hanger 31. An orientation sleeve 46 with a helical surface is secured to the lower end of production tree 39. When tree 39 is lowered into wellhead housing 21, orientation sleeve 46 engages orientation member 44 to rotate production tree 39 and orient it in the desired direction relative to tubing hanger 31.

Tree 39 includes a connector assembly for securing it to wellhead housing 21. The connector assembly includes a connector body 45 that has a downward facing shoulder 47 that lands on rim 37. Connector body 45 is rigidly attached to tree 39. A seal 49 seals between rim 37 and shoulder 47. Connector body 45 also extends downward into wellhead housing 21. A locking element 51 is located at the lower end of connector body 45 for engaging profile 35. Locking element 51 could be of a variety of types. In this embodiment, locking element 51 comprises an outer split ring that has a mating profile to groove 35. A plurality of dogs 53 located on the inner diameter of locking element 51 push locking element 51 radially outward when moved by a cam sleeve 55. Cam sleeve 55 moves axially and is hydraulically driven by hydraulic fluid supplied to a piston 57.

The connector assembly has an extended or retainer portion 59 that extends downward from connector body 45 in this embodiment. Extended portion 59 is located above and secured to orientation sleeve 46. A collar 60 is threaded to the outer diameter of extended portion 59 for retaining locking element 51 and dogs 53 with connector body 45. Alternately dogs 53 could be used to engage profile 35 and locking element 51 omitted. In that case, windows could be provided for the dogs in connector body 45, and extended portion 59 and collar 60 would be integrally formed with connector body 45.

Referring to FIG. 1A, a control fluid passage 61 extends through tree 39 to an exterior side portion for supplying control fluid. Although not shown, there are a number of these passages, and they lead to connector tubes on the lower end of tree 39. The connector tubes stab into mating passages on the upper end of tubing hanger 31. These passages lead to hydraulic control lines that are not shown but extend below tubing hanger 31 on the outside of production tubing 33. These control lines lead to downhole equipment in the tubing string, such as a downhole safety valve and a sliding sleeve.

At least one valve is mounted to production tree 39 for controlling fluid flow. In the preferred embodiment, the valves includes a master valve 63 and a swab valve 65 located in production passage 41. A wing valve 67 is mounted to port 41a. The hydraulic actuator 68 for wing valve 67 is shown. Valves 63 and 65 may be either hydraulically actuated or mechanically actuated (typically by ROV). Wing valve 67 is connected to a flow line loop 69 that leads over to a flow line connector 71 on the opposite side as shown in FIG. 1B. Flow line connector 71 will connect to a flow line 73 that typically leads to a manifold or subsea processing equipment. In this embodiment, flow line 73 is mounted to a vertical guide pin 75 that stabs into a funnel 77. Funnel 77 is supported from tree 39 by an arm 79. Other types of connections to flow line connector 71 could also be employed.

Referring again to FIG. 1A, tree 39 has a mandrel 81 on its upper end that protrudes upward. Mandrel 81 is sized for typically receiving a connector for connection to a small diameter, lightweight riser, such as for certain workover purposes. Mandrel 81 also enables other methods of intervention.

Figure 3:
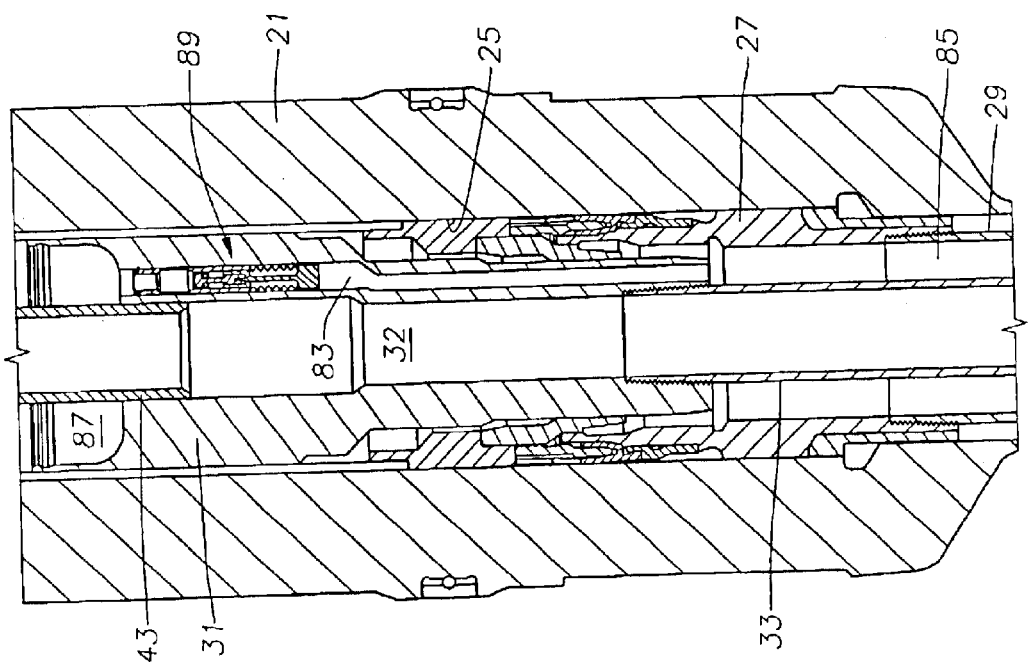
FIG. 3 is an enlarged sectional view of a portion of the wellhead assembly of FIGS. 1A–1B, but shown in a different sectional plane to illustrate a tubing annulus valve in a closed position.

FIG. 3 illustrates a tubing annulus passage 83, which is not shown in FIGS. 1B or 2 because tubing annulus passage 83 is located in a different vertical sectional plane than that shown in FIGS. 1B and 2. Tubing annulus passage 83 extends vertically through tubing hanger 31 from an upper end portion to a lower end, where it communicates with a tubing annulus 85 surrounding tubing 33. The upper and lower ends of tubing annulus passage 83 may be slightly radially offset from each other, as shown in FIG. 3. An annular void space 87 surrounds isolation tube 43 between the upper end of tubing hanger 31 and the lower end of tree 39.

Figure 4:
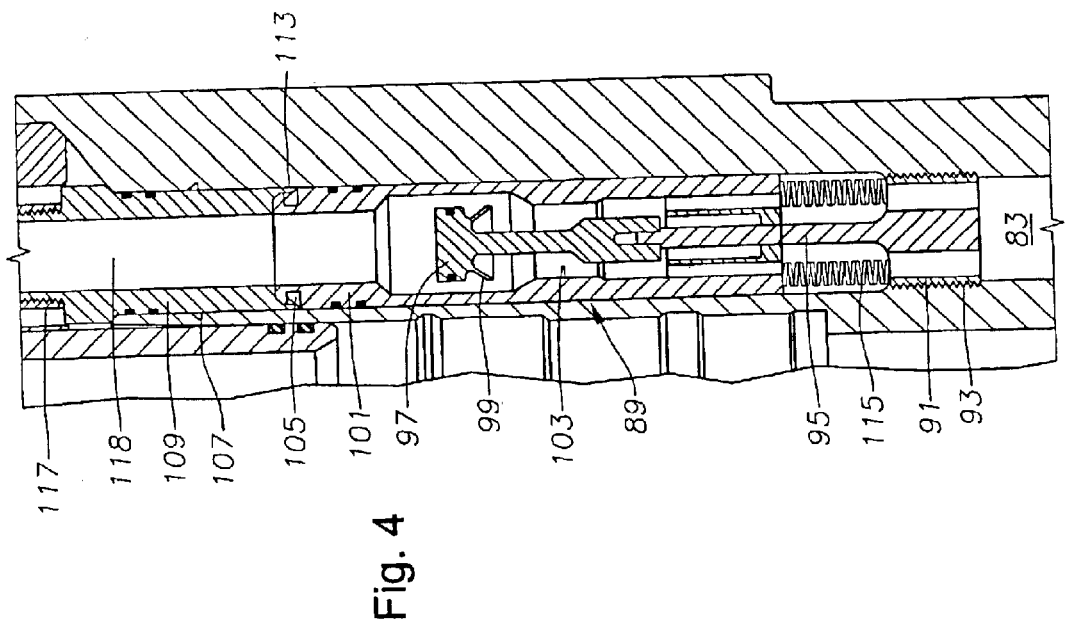
FIG. 4 is an enlarged sectional view of the tubing annulus valve of FIG. 3, shown in an open position and engaged by an engaging member of the production tree.

A tubing annulus valve 89 is mounted in tubing annulus passage 83 to block tubing annulus passage 83 from flow in either direction when closed. Referring to FIG. 4, tubing annulus valve 89 has a stem base 91 that is secured by threads 93 to tubing annulus passage 83. A stem 95 extends upward from stem base 91 along the axis of tubing annulus passage 83. An enlarged valve head 97 forms the upper end of stem 95. Valve head 97 has a secondary resilient seal as well as a primary lip seal 99 that is made of metal in this embodiment.

A shuttle sleeve 101 is reciprocally carried in tubing annulus passage 83. While in the upper closed position shown in FIGS. 3 and 5, the upper end of sleeve 101 is a short distance below an upper end portion of tubing hanger 31. While in the lower open position, shown in FIGS. 4 and 6, sleeve 101 is in a lower position relative to valve head 97. Sleeve 101 has a reduced diameter port or seat 103 formed in its interior. Seat 103 is sealingly engaged by lip seal 99 as well as the resilient seal of valve head 97 while sleeve 101 is in the upper position.

An outward biased split ring 105 is mounted to the outer diameter of sleeve 101 near its upper end. Split ring 105 has a downward tapered upper surface and a lower surface that is located in a plane perpendicular to the axis of tubing annulus passage 83. A mating groove 107 is engaged by split ring 105 while sleeve 101 is in the upper, closed position. Split ring 105 snaps into groove 107, operating as a detent or retainer to prevent downward movement of sleeve 101.

FIG. 4 shows an engaging tool or member 109 extending into the upper end of tubing annulus passage 83 into engagement with the upper end of sleeve 101. Engaging member 109 is a downward extending component of tree 39 and is used for moving sleeve 101 from the upper to the lower position. A second identical engaging member 109', shown in FIGS. 5 and 6, is mounted to a running tool 111 used to run tubing hanger 31. Engaging member 109 has a lip 113 on its lower end that mates with the upward facing taper on split ring 105. Lip 113 slides over and causes split ring 105 to contract, enabling engaging member 109 to push sleeve 101 downward to the open position. A spring 115, which may be a plurality of Belleville washers, is located between stem base 91 and the lower end of sleeve 101. Spring 115 urges sleeve 101 to the upper closed position. Any pressure in passage 83 would assist spring 115 in moving sleeve 101 to the closed position.

Engaging member 109 is secured to the lower end of an actuator 117, which is mounted in tree 39. Actuator 117 is a hollow, tubular member with open ends reciprocally carried in a tubing annulus passage 118 in tree 39 (FIG. 2). Actuator 117 has a piston portion on its exterior side wall that is selectively supplied with hydraulic fluid for moving actuator 117 between upper and lower positions. Tubing annulus passage 118 extends through tree 39 to an exterior side portion of tree 39 for connection to a tubing annulus line that leads typically to a subsea manifold. Tubing annulus passage in tree 118 does not extend axially to the upper end of tree 39.

When actuator 117 is moved to the lower position, engaging member 109 engages and pushes sleeve 101 from the closed position to the open position. FIGS. 5 and 6 show a similar actuator 117' that forms a part of running tool 111 and works in the same manner as actuator 117. Like actuator 117, actuator 117' has a piston portion that is carried in a hydraulic fluid chamber for causing the upward and downward movement in response to hydraulic pressure. Passage 118' leads to an exterior upper portion of running tool 111 for delivering and receiving tubing annulus fluid.

Running tool 111 has conventional features for running tubing hanger 31, including setting a seal between tubing hanger 31 and bore 25 of wellhead housing 21 (FIG. 3). Running tool 111 has a lock member 119 that is radially and outwardly expansible into a mating groove formed in an interior upward extending sleeve portion of tubing hanger 31. Lock member 119 secures running tool 111 to tubing hanger 31 while tubing 33 is being lowered into the well. Lock member 119 is energized and released by a lock member actuator 121, which is also hydraulically driven. Running tool 111 has a sleeve 123 that slides sealingly into the bore 32 of tubing hanger 31. Sleeve 123 isolates the upper end of tubing annulus passage 83 from production passage 32 (FIG. 3) in tubing hanger 31.

In operation, outer wellhead housing 13 is secured to conductor 15, which is installed in a first section of the well. Wellhead housing 21 is secured to casing 23, which is installed in the well. A drilling riser and lower marine package that includes a blowout preventer is run onto wellhead housing 21. The well is drilled deeper and casing 29 is run and suspended by casing hanger 27 in bore 25 of wellhead housing 21. Then, production tubing 33 is run through the drilling riser with tubing hanger 31.

As shown in FIG. 5, running tool 111 is secured to tubing hanger 31 to run and install tubing hanger 31. Once connected, actuator 117' is preferably stroked to move engaging member 109' downward, thereby causing shuttle sleeve 101 to move downward. This opens tubing annulus passage 83 for upward and downward flow. A conduit, typically drill pipe, will be connected to the upper end of running tool 111 for running tubing 33.

After tubing hanger 31 has been set, the operator may test the annulus valve 89 by stroking actuator 117' upward, disengaging engaging member 109 from sleeve 101 as shown in FIG. 5. Spring 115 pushes sleeve 101 to the upper closed position. In this position, valve head seal 99 will be engaging sleeve seat 103, blocking flow in either the upward or downward direction. While in the upper position, detent split ring 105 engages groove 107, preventing any downward movement.

The operator then applies fluid pressure to passage 118' within running tool 111. This may be done by closing the blowout preventer on the drill pipe above running tool 111. The upper end of passage 118' communicates with an annular space surrounding the drill pipe below the blowout preventer. This annular space is also in communication with one of the choke and kill lines. The operator pumps fluid down the choke and kill line, which flows down passage 118' and acts against sleeve 101. Split ring 105 prevents shuttle sleeve 101 from moving downward, allowing the operator to determine whether or not seals 99 on valve head 97 are leaking.

The well is perforated and completed in a conventional manner. In one technique, this may be done prior to installing tree 39 by lowering a perforating gun through the tubing hanger running string in the drilling riser and through tubing 33. The tubing hanger running string may optionally include a subsea test tree that extends through the drilling riser. If desired, the operator may circulate out heavy fluid contained in the well before perforating. This may be done by opening tubing annulus valve 89 by stroking actuator 117' and engaging member 109' downward. Engaging member 109' releases split ring 105 from groove 107 and pushes sleeve 101 downward to the open position of FIG. 6. A port such as a sliding sleeve (not shown) at the lower end of tubing 33 is conventionally opened and the blowout preventer is closed around the tubing hanger running string. The operator may circulate down the running string and tubing 33 with the flow returning up tubing annulus 85 into the drilling riser and up a choke and kill line. Reverse circulation could also be performed.

After perforating and testing, the operator will set a wireline conveyed plug (not shown) in a profile in tubing hanger production passage 32. Tubing annulus valve 89 is closed by stroking actuator 117' upward, causing spring 115 to move sleeve 101 upward. The operator then retrieves running tool 111 on the running string through the blowout preventer and drilling riser. The downhole safety valve (not shown) in tubing 33 is above the perforations and is preferably closed to provide a first pressure barrier. The wireline plug in tubing hanger production passage 32 provides a second pressure barrier. Tubing annulus 85 normally would have no pressure, and tubing annulus valve 89 provides a pressure barrier in the event pressure did exist.

The operator will then release the drilling riser from wellhead housing 21 and run tree 39. Tree 39 is preferably not run on a riser, although it could be. If it is not run on riser, this frees the derrick on the floating platform for working on nearby wells in the field being developed. The platform to be moved a short distance to a new location for drilling a new well or completing work on a partially drilled well. Tree 39 is preferably run by a cable or lift line with the assistance of an ROV (remote operated vehicle). The lift line winch may be located on the same platform, off to one side from the derrick, or it could be on a separate platform that may have a crane for various purposes but no derrick. In either event, the winch for the cable is located at a place that is out of the critical path for drilling operations. The cable (not shown) has a connector that connects to mandrel 81 of production tree 39.

As tree 39 lands in wellhead housing 21, its lower end will move into bore 25 of wellhead housing 21, and isolation tube 43 will stab into production passage 32 of tubing hanger 31. While being lowered, orientation member 44 engages orientation sleeve 46 to properly orient tree 39 relative to tubing hanger 31. Once landed, the operator supplies hydraulic fluid pressure to cam sleeve 55, causing dogs 53 to push locking element 51 (FIG. 2) to the outer engaged position with profile 35. Flowline connector 71 (FIG. 1B) of tree 39 is connected to flowline 73 and the tubing annulus passage (not shown) in tree 39 is connected to a manifold or a related facility.

In a preferred technique, with the assistance of an ROV, the operator connects a retrieval tool (not shown) to mandrel 81 and removes the plug (not shown) in tubing hanger 31. The retrieval tool has a downward extending stem that extends through tree production passage 41 into tubing hanger production passage 32. The downhole safety valve may be closed during this procedure to isolate any pressure from tree production passage 41. Also, the retrieval tool utilizes pressure controlling seals around its stem. Once the plug is removed from tubing hanger 31, tree 39 should be ready for production.

During production, tubing annulus valve 89 may remain closed, but is typically held open for monitoring the pressure in tubing annulus 85. If tubing annulus valve 89 is closed, it can be opened at any time by stroking actuator 117 (FIG. 4) of tree 39 downward. Any pressure within tubing annulus 85 is communicated through tubing annulus passage 118 in tree 39 and to a monitoring facility.

For a workover operation that does not involve pulling tubing 33, a light weight riser with blowout preventer may be secured to tree mandrel 81. An umbilical line would typically connect the tubing annulus passage on tree 39 to the surface vessel. Wireline tools may be lowered through the riser, tree passage 41 and tubing 33. The well may be killed by stroking actuator 117 (FIG. 4) downward to open tubing annulus valve 89. Circulation can be made by pumping down the riser, through tubing 33, and from a lower port in tubing 33 to tubing annulus 85. The fluid returns through tubing annulus passage 83 and passage 118 in tree 39 to the umbilical line.

For workover operations that require pulling tubing 33, tree 39 must be removed from wellhead housing 21. The lightweight riser would not be required if the tubing hanger plug is reset into tubing hanger 31 with the ROV conveyed tool. The downhole safety valve would be closed. Tree 39 is retrieved on a cable with the assistance of an ROV. Then a drilling riser is lowered into engagement with wellhead housing 11. The operator retrieves tubing 33 and performs the workover in a conventional manner.

The invention has significant advantages. Access to the tubing annulus is readily obtainable by stroking an actuator in the tree or in the tubing hanger running tool. The retention device allows the tubing annulus valve to be tested from above. All of the hydraulic passages and components for stroking the actuator for the tubing annulus valve are located exterior of the tubing hanger. This avoids using us internal space in the wall of the tubing hanger that is needed for other passages.

While the invention has been shown in only one of its forms, it should be apparent to those skilled in the art that it is not so limited but susceptible to various changes without departing from the scope of the invention. For example, while the tubing annulus valve is shown in connection with a tree that internally connects to the wellhead housing, it could also be utilized with trees that connect externally. Furthermore, the tubing annulus valve could be utilized with a tubing hanger landed in a tree, such as a horizontal tree, rather than in a wellhead housing. Other types of retention devices could be employed to retain the annulus valve in the closed position for testing. For example, a gripping device on the running tool engaging member could be utilized to grip the shuttle sleeve and hold it in an upper position while the testing is occurring. The tree could be run on a riser rather than a lift line, in which case the temporary wireline plug in the tubing hanger production passage would be conventionally retrieved on wireline. If run on a riser, perforating could be accomplished after the tree is place by lowering the perforating gun through the riser and tree.

We claim:

1. In a subsea well assembly having a tubular member located subsea at an upper end of the well, a tubing hanger landed in the tubular member, the tubing hanger connected to a string of tubing extending into the well, the tubing hanger having a production passage for flowing production fluid from the well, the tubing hanger having a tubing annulus passage in communication with a tubing annulus surrounding the tubing, the improvement comprises:

a tubing annulus valve located in the tubing annulus passage, the tubing annulus valve having an axially movable member adapted to be moved from a upper closed position to an open position;

a retention device for retaining the movable member in the closed position while test pressure from above the movable member is applied to the tubing annulus passage from an exterior source; and an engaging tool mounted exterior of the tubing hanger that selectively releases the retention device and moves the movable member from the closed position to the open position.

2. The well assembly according to claim 1, wherein the retention device comprises a detent that is cooperatively located on the movable member and in the tubing annulus passage.

3. The well assembly according to claim 1, wherein the retention device comprises;

a groove formed in the tubing annulus passage; and a split ring mounted to the movable member for snapping into engagement with the groove.

4. The well assembly according to claim 1, wherein the movable member is biased toward the closed position by a spring, and downward movement of the movable member caused by the engaging tool causes compression of the spring.

5. The well assembly according to claim 1, wherein the movable member comprises a sleeve, and the tubing annulus valve further comprises:

a valve head stationarily mounted in the tubing annulus passage and extending into the sleeve for engagement with an interior df the sleeve while the sleeve is in the closed position; and a spring mounted to a lower end of the sleeve for urging the sleeve upward.

6. The well assembly according to claim 1, further comprising:

a running tool that releasably secures to the tubing hanger, the running tool adapted to be mounted to a conduit for lowering the tubing hanger into the tubular member; and wherein the engaging tool is hydraulically driven between upper and lower positions and carried by the running tool.

7. The well assembly according to claim 1, wherein the tubular member comprises a wellhead housing, and the well assembly further comprises:

a production tree mounted on the wellhead housing; and wherein the engaging tool is hydraulically driven between upper and lower positions and carried by the tree.

8. The well assembly according to claim 1, wherein the engaging tool is hydraulic driven by hydraulic circuitry located exterior of the tubing hanger, the tubing hanger being free of any hydraulic passages for moving the movable member from the closed position to the open position.

9. A subsea well assembly, comprising:

a tubular member adapted to be located subsea at an upper end of the well;

a tubing hanger landed in the tubular member and adapted to be connected to a string of tubing extending into the well;

a tubing annulus passage extending through the tubing hanger in communication with a tubing annulus surrounding the tubing;

a sleeve located in the tubing annulus passage at an upper end of the tubing hanger, the sleeve having a seat that is adapted to communicate with the tubing annulus;

a spring mounted to the sleeve for urging the sleeve upward to a closed position, blocking flow through the seat of the sleeve and the tubing annulus passage;

a detent that releasably retains the sleeve in the closed position;

an engaging tool that selectively engages the sleeve to release the detent and move the sleeve from the closed position to an open position; and wherein the detent prevents movement of the sleeve to the open position in response to fluid test pressure applied to the tubing annulus passage above the sleeve.

10. The well assembly according to claim 9, further comprising:

a valve head mounted to a stem that is secured stationarily in the tubing annulus passage, the valve head being positioned in an interior of the sleeve for engaging the seat when the sleeve is in the closed position.

11. The well assembly according to claim 9, wherein the detent comprises:

an annular groove formed in the tubing annulus passage; and a split ring mounted to an exterior portion of the sleeve for snapping into engagement with the groove.

12. The well assembly according to claim 9, further comprising:

a running tool for engaging the tubing hanger and lowering the tubing hanger into the tubular member; and wherein the engaging tool is mounted to the running tool.

13. The well assembly according to claim 9, further comprising:

a tree mounted to the tubular member and extending upward therefrom; and wherein the engaging tool is mounted to the tree.

14. The well assembly according to claim 9, wherein the engaging tool is hydraulically driven and located exterior of the tubing hanger, the tubing hanger being free of any hydraulic passages for moving the sleeve from the closed position to the open position.

15. In a subsea well assembly having a tubular member located subsea at an upper end of the well, a tubing hanger landed in the tubular member, the tubing hanger connected to a string of tubing extending into the well, the tubing hanger having a production passage for flowing production fluid from the well, the tubing hanger having a tubing annulus passage in communication with a tubing annulus surrounding the tubing, the improvement comprises:

a tubing annulus valve located in the tubing annulus passage, the tubing annulus valve having an axially movable member adapted to be moved from a closed position to an open position; and a hydraulically driven engaging tool mounted exterior of the tubing hanger that selectively moves axially to engage and move the movable member from the closed position to the open position, the tubing hanger being free of any hydraulic passages for moving the movable member from the closed position to the open position.

16. The well assembly according to claim 15, further comprising a tubing hanger running tool for running the tubing hanger; and wherein the engaging tool is mounted to the tubing hanger running tool.

17. The well assembly according to claim 15, further comprising a tree mounted to the tubular member for controlling fluids flowing through the tubing hanger; and wherein the engaging tool is mounted to the tree.

18. The well assembly according to claim 15, further comprising:

a tubing hanger running tool for running the tubing hanger, the tubing hanger running tool subsequently being retrieved;

a tree that lands on the tubular member after the tubing hanger running tool has been retrieved, for controlling flow of fluids through the tubing hanger; and wherein said engagement tool comprises a running tool engagement tool that is mounted to the tubing hanger running tool and a tree engagement tool that is mounted to the tree.

19. A method of running a string of tubing and testing a tubing annulus valve located in a tubing hanger, comprising:

(a) providing the tubing annulus valve with an axially movable member;

(b) connecting a running tool with the tubing hanger, the running tool having an engaging tool that contacts the movable member and moves the movable member to an open position;

(c) with the running tool, lowering the tubing into the well and landing the tubing hanger in a tubular member located at an upper end of the well;

(d) retracting the engaging tool and moving the movable member to a closed position, thereby blocking downward flow through the tubing annulus valve; and (e) applying fluid test pressure to the tubing annulus passage above the movable member while retaining the movable member in the closed position.

20. The method according to claim 19, wherein:

step (a) further comprises providing the movable member with a spring;

step (b) causes compression of the spring as the movable member moves to the open position, and step (d) is performed by disengaging the engaging tool of the running tool with the movable member, the spring pushing the movable member to the closed position.

21. The method according to claim 19, wherein step (e) is performed by causing the movable member to engage a detent.

22. The method according to claim 19, further comprising:

after step (e), retrieving the running tool and installing a production tree onto the tubular member, the production tree being provided with a second engaging tool in addition to the first mentioned engaging tool; then extending the second engaging tool into engagement with the movable member and moving the movable member with the second engaging tool to the open position.

* * * * *

UNITED STATES PATENT AND TRADEMARK OFFICE
CERTIFICATE OF CORRECTION

PATENT NO.   : 6,840,323 B2
DATED        : January 11, 2005
INVENTOR(S)  : Stephen P. Fenton et al.

It is certified that error appears in the above-identified patent and that said Letters Patent is hereby corrected as shown below:

Column 2,
Line 18, delete "closely" and insert -- closing --

Column 7,
Line 29, delete "to" and insert -- may --
Line 32, delete "us" and insert -- up --

Column 9,
Line 27, delete "df" and insert -- of --
Line 48, delete "hydraulic" and insert -- hydraulically --

Signed and Sealed this

Seventh Day of June, 2005

JON W. DUDAS
*Director of the United States Patent and Trademark Office*